Dec. 17, 1929.  F. J. KRABER  1,740,308
NUT LOCK
Filed Sept. 26, 1928
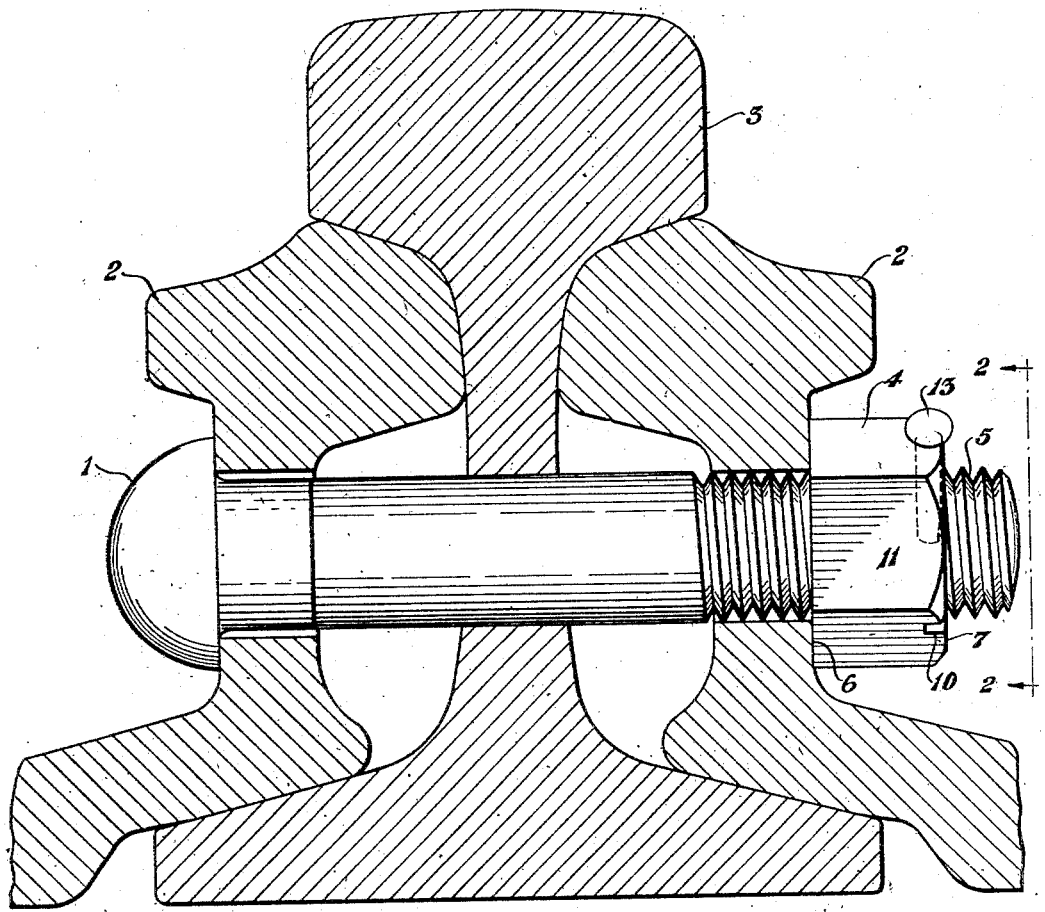
Fig.1
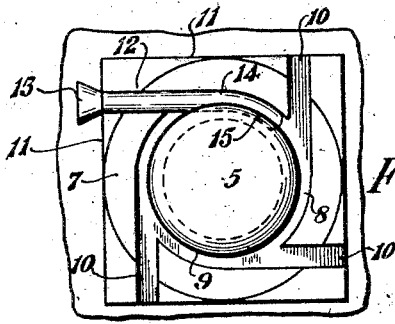
Fig. 3
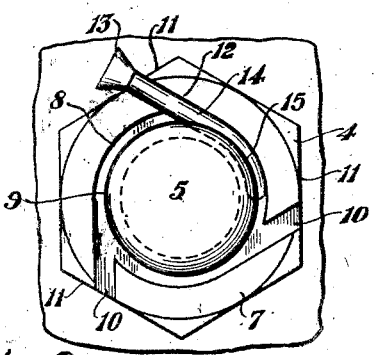
Fig 2
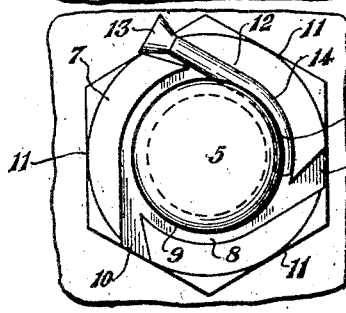
Fig. 4
Fig. 5
Inventor
Frank J. Kraber
By Harry Frease
Attorney Patented Dec. 17, 1929

1,740,308

UNITED STATES PATENT OFFICE

FRANK J. KRABER, OF CLEVELAND, OHIO, ASSIGNOR, BY DIRECT AND MESNE ASSIGNMENTS, TO KRABERHALL, INC., OF PHILADELPHIA, PENNSYLVANIA, A CORPORATION OF PENNSYLVANIA

NUT LOCK

Application filed September 26, 1928. Serial No. 308,385.

The invention relates to nut locks and more particularly to improvements in the nut locks of my prior application for patent, Serial No. 245,667, filed January 10, 1928, wherein is set forth a nut having an annular groove on one of its ends and surrounding the central threaded bore of the nut, an entrance groove being also formed in the same end of the nut and leading from one side of the nut to the annular groove, and a locking pin being driven through said straight groove from the outer end thereof to enter the annular groove, and the locking pin being preferably made of softer material than the nut and the bolt upon which the nut is screwed, whereby the pin is bent as it enters the annular groove, and forms, between the surfaces of the groove and the bolt thread surfaces angular thereto, a wedge which acts to prevent unscrewing of the nut on the bolt. These features are also found in the present case which is a continuation of the common subject matter contained in applicant's earlier copending application enumerated above.

In my aforesaid prior application, the grooves are provided in the inner end face of the nut adjacent the head of the bolt, which inner end face is screwed against one of the outer opposed surfaces of the pieces being held together by the nut and bolt.

When the grooves are thus formed in the inner end face of the nut, some difficulties are encountered in inserting the locking pin, and in tightening the nut to the degree sometimes desired.

The object of the present improvement is to provide a more accessible nut having an annular groove in its outer end face, and surrounding the central threaded bore of the nut, and an entrance groove also being formed in the outer end face of the nut and leading from one side of the nut to the annular groove, whereby the nut may be screwed upon the bolt as tightly as may be desired, and the locking pin may be more conveniently driven through the entrance groove and into the annular groove for forming a locking wedge as aforesaid.

Experiments and tests have demonstrated that nut locks embodying the present improvements are equally if not more efficient than the particular form set forth in the aforesaid prior application.

Preferred embodiments of the present improvements are illustrated in the accompanying drawing, forming part hereof, in which Figure 1 is a transverse sectional view through a rail and two fish plates secured together by a bolt and an improved hexagonal locking nut locked on the bolt by one of the improved locking pins hereof;

Fig. 2, a fragmentary end view of the bolt, locking nut, and locking pin in the direction of the arrows 2—2, Fig. 1;

Fig. 3, a view similar to Fig. 2, illustrating a square locking nut embodying the present improvements and applied on a bolt and secured by one of the locking pins hereof;

Fig. 4, a view similar to Fig. 2, illustrating a modified form of hexagonal locking nut applied on a bolt and secured by one of the locking pins; and Fig. 5, a perspective view illustrating a preferred form of locking pin.

Similar numerals refer to similar parts throughout the several views.

A railroad bolt of usual construction is indicated at 1 in use for clamping together in a usual manner fish plates 2 and 2' and a rail 3, the rail being interposed between the fish plates and the bolt passing through suitable registered apertures in the fish plates and rails.

An improved hexagonal locking nut 4 embodying the present invention, is screwed on the outwardly extending threaded end 5 of the bolt, so that the inner end face 6 of the locking bolt 4 abuts with the desired pressure against the opposite outer surface of the fish plate 2.

For securely locking the nut 4 at the desired position on the threaded end 5 of the bolt 1, the locking nut is provided in its outer end face 7 with an annular groove 8 surrounding the central screw threaded bore 9 of the nut; the groove 8 being in a plane normal to the axis of the bolt.

One or more axially straight entrance grooves 10 are also formed in the outer end face 7 of the nut 4, and each entrance groove leads from a surface, preferably one of the outer sides 11 of the nut to the annular groove 8 and connect and communicate with the groove 8 at an angle substantially tangential thereto, and with an axial depth substantially coinciding with the depth of the annular groove.

Several of the entrance grooves 10 are provided leading from several of the side faces of the nut to the annular groove 8, so that where the nut is used in a location where it is only accessible from one side, one of the entrance grooves will always be in position for use.

After the nut has been screwed upon the bolt as aforesaid, a locking pin 12, which is preferably made of slightly softer material than the nut and bolt, and which is preferably provided with a tapered head 13, is driven into one of the entrance grooves 10, so that the outer end of the shank 14 of the locking pin enters the annular groove 8 between the outer side surfaces thereof and the exposed surfaces of the bolt threads, which are angular to the annular groove surfaces, whereby the end of the shank 14 of the locking pin becomes an arcuate wedge in an arcuate portion of the annular groove, as at 15, which securely locks the nut 4 in the desired position on the bolt.

The end of the shank 14 of the locking pin, as it enters between the annular groove surfaces and the angular bolt thread surfaces, is not only curved arcuately but is also bent sidewise in the direction of the bolt axis, and the extreme tip of the locking pin fully or partially cuts across one or more of the bolt threads.

Accordingly the nut is so securely locked upon the bolt, that unless it is removed in the proper manner as will hereinafter be set forth, the threads will be partially stripped from the bolt.

In order to properly remove the nut from the bolt after it has been locked thereon as aforesaid, if the nut is not screwed as tightly as possible against the outer abutting surfaces of the pieces being secured by the nut and bolt, it is only necessary to advance the nut a portion of a turn, and then to withdraw the pin from the grooves by grasping the head 13 of the pin by pliers or the like.

If the nut is screwed against the clamped pieces as tightly as possible, the nut may be removed from the bolt by backing off the nut a fraction of a turn, then by advancing the nut a fraction of a turn, whereby the wedge engagement of the locking pin is released and the locking pin may be withdrawn from the grooves as aforesaid.

When the nut lock of the present invention is subject to vibration, as in railroad service, the fact that the end of the locking pin shank is bent or curved as aforesaid, prevents mere vibration of the nut and bolt from loosening the same.

In withdrawing the pin as aforesaid by pliers or the like, the bend or curve in the outer end of the locking pin is straightened out by the withdrawing force as the bent end passes from the annular groove to the entrance groove, and such a straightening is not possible by the forces set up by vibration.

I claim:

1. In combination with a screw threaded bolt, a nut having an annular groove in its outer end face about its central threaded bore, an entrance groove extending from a side of the nut to said annular groove, and a locking pin driven through the entrance groove and between surfaces of the annular groove and the bolt threads.

2. In combination with a screw threaded bolt, a nut having an annular groove in its outer end face about its central threaded bore, an entrance groove extending from a side of the nut to said annular groove and tangential thereto, and a locking pin driven through the entrance groove and between surfaces of the annular groove and the bolt threads.

3. In combination with a screw threaded bolt, a nut having a central threaded bore and having an annular groove in a face at one end of the central threaded bore, a straight groove extending from a side of the nut only to said annular groove, and a locking pin located in the straight groove and extending into the annular groove and in gripping and wedging engagement with the threaded bolt and annular groove.

4. In combination with a screw threaded bolt, a nut having a central threaded bore and having an annular groove in a face at one end of the central threaded bore, a straight groove extending from a side of the nut only to said annular groove and tangential thereto, and a locking pin located in the straight groove and extending into the annular groove and in gripping and wedging engagement with the threaded bolt.

5. In combination with a screw threaded bolt, a nut having a central threaded bore and having an annular groove in a face at one end of the central threaded bore, a straight groove extending from a side of the nut only to said annular groove, and a locking pin located in the straight groove and extending into the annular groove and in gripping and wedging engagement with the threaded bolt, said locking pin having a shouldered head whereby a tool may be inserted between said head and nut for removing the pin.

6. In combination with a screw threaded bolt, a nut having a central threaded bore and having an annular groove in one face at one end of the central threaded bore, an entrance groove extending from a surface of the nut to said annular groove, and a locking pin driven through said entrance groove and extending into the annular groove and in gripping and wedging engagement with the threads of the bolt.

7. In combination with a screw threaded bolt, a nut having a central threaded bore and having an arcuate groove in one face at one end of the central threaded bore, the groove being in a plane normal to the axis of the bolt, an entrance groove extending from a surface of the nut to said arcuate groove, and a locking pin driven through said entrance groove and extending into the arcuate groove and in gripping and wedging engagement with the threads of the bolt.

8. In combination with a screw threaded bolt, a nut having a central threaded bore and having an arcuate groove in the central threaded bore, the groove being in a plane normal to the axis of the bolt, an entrance groove extending from a surface of the nut to said arcuate groove, and a locking pin driven through said entrance groove and extending into the arcuate groove and in gripping and wedging engagement with the threads of the bolt.

9. A nut for a screw threaded bolt, said nut having a central threaded bore and having an arcuate groove in the central threaded bore, the groove being in a plane normal to the axis of the bolt, and an entrance groove extending from a surface of the nut into the arcuate groove substantially tangential thereto, the axial depth of the one groove at its entrance into the other groove coinciding with the depth of the other groove, whereby a locking pin driven through the entrance groove into the arcuate groove will extend in gripping and wedging engagement with the threads of the bolt.

In testimony that I claim the above, I have hereunto subscribed my name.

FRANK J. KRABER.